United States Patent [19]

Weyand, Jr.

[11] Patent Number: 4,609,161

[45] Date of Patent: Sep. 2, 1986

[54] SYSTEM AND APPARATUS FOR STORING AND PROCESSING STRIP MATERIAL

[75] Inventor: Harley P. Weyand, Jr., Doylestown, Ohio

[73] Assignee: The Firestone Tire & Rubber Company, Akron, Ohio

[21] Appl. No.: 696,288

[22] Filed: Jan. 30, 1985

[51] Int. Cl.[4] .................... B65H 16/02; B65H 18/10; B65H 75/00

[52] U.S. Cl. ................................ 242/55; 242/67.1 R; 242/58.6; 242/79

[58] Field of Search ............... 242/55, 67.3 R, 67.1 R, 242/58.6, 58, 79, 80, 55.53, 68.3, 68.1, 68.2

[56] References Cited

U.S. PATENT DOCUMENTS

| | | | |
|---|---|---|---|
| 2,635,822 | 4/1953 | Burman, Jr. | 242/67.3 R |
| 2,755,028 | 7/1956 | Noall | 242/55 |
| 3,012,735 | 12/1961 | Nebout | 242/67.3 R |
| 3,026,230 | 3/1962 | Nebout | |
| 3,219,206 | 11/1965 | Cocker, III | 242/67.3 R |
| 3,424,394 | 1/1969 | Moore | 242/58.6 |
| 3,438,593 | 4/1969 | Reed | 242/79 |
| 3,478,974 | 11/1969 | Roscoe et al. | 242/58 |
| 3,498,555 | 3/1970 | Leblond et al. | 242/55 |
| 3,623,677 | 11/1971 | Appleby et al. | 242/67.3 R |
| 3,695,532 | 10/1972 | Lindstaedt | 242/55 |
| 4,013,177 | 3/1977 | Kinnicutt et al. | 242/79 X |
| 4,309,000 | 1/1982 | Schefer | 242/79 X |

Primary Examiner—John M. Jillions
Attorney, Agent, or Firm—Ronald Brietkrenz

[57] ABSTRACT

A system and apparatus therefor which stores and processes flexible strip materials and particularly tire manufacturing components such as the tread portion. A portable storage unit has a pair of hollow, cylindrical-shaped spools loosely supported on a pair of cradles within a frame. A pair of annular flanges adjacent the ends of each of the spool surfaces engages stop plates on the frame to retain the spools in position on the cradles when the frame is in both a vertical load and unload position and a horizontal storage and transport position. Drive units for loading and unloading the spools preferably are similar, each including a pair of expanding mandrels and a motor driven chain connected to one of the mandrels. The storage unit is placed on a carriage which is located adjacent the mandrels of the drive units by material handling equipment. The carriage is moved horizontally toward the stationery mandrels until the mandrels are inserted within the spool interiors. The mandrels then are expanded securely gripping the spools thereon. The carriage platform then is lowered allowing the spools to lift off their supporting cradles enabling the spools to be rotated freely by the mandrels for loading and unloading the strip material on or off the spools. A storage unit is loaded with extruded tire tread material in the vertical position and then is placed in a horizontal position for subsequent shipment and storage reducing the formation of imperfections in the tread which occurs if the tread is aged in the vertical stored position.

41 Claims, 19 Drawing Figures

SYSTEM AND APPARATUS FOR STORING AND PROCESSING STRIP MATERIAL

TECHNICAL FIELD

The invention relates to a system and apparatus for storing and processing strip material and in particular strip materials used in the manufacture of tires. More particularly, the invention relates to such a system and apparatus which enables the strip material to be loaded into a portable storage unit at an extrusion site and transported to a storage area and then to the tire making equipment in a simpler, more efficient manner than heretofore possible.

BACKGROUND ART

The trend today in all industries is more automation in order to achieve cost reduction, increased quality control and uniform productivity. Such trend is also true in the tire industry. In the building of tires, various strip material components are used such as the sidewall stabilizer ply, inner liner body ply, calendered fabric, and tire tread. These strip components originate at various locations and are brought to the tire production site in various packages for assembling into the completed tire. Heretofore, many of the strip components, with the exception of the tire tread, were handled in reel form for transportation between the production and assembling sites. However, more recently the tire tread has been stored and transported in reel form to achieve better handling, storage, and shipment of the tread component.

This packaging of the strip components is one of the main components of any tire manufacturing process or system. Improving the various component packaging will result in better assurance of component integrity and quality and better compatibility with the state of the art automatic process material handling and storage equipment. The specific component package is a very integral part of the system and the package must be able to satisfy the needs of the process equipment, the storer of the package, and the ultimate user of the package equipment at the tire construction site.

Heretofore, the tire tread was cut to lengths and manually handled into tread books or trays and allowed to stabilize and shrink to a theoretical proper length to go around the circumference of the tire. Relatively high cut length reject rates would result.

Others in the art have attempted to eliminate the tread handling problem by storing the tread as well as other strip components on reels, such as shown in U.S. Pat. No. 3,026,230. This patent discloses a reel having a liner spool for storing strips of rubber such as the tire tread for use in the tire making industry.

Other known art related to the present invention are disclosed in the following patents. U.S. Pat. No. 2,755,028 discloses another reel having a liner roller, a tire material roller and an auxillary roller as well as motors for driving and braking either roller together with means for conveying the tire tread material to and from the reel for winding and unwinding. U.S. Pat. No. 3,498,555 discloses another reel having a winding and unwinding box which is driven by means of hubs which engage the shafts of the liner and material spools. U.S. Pat. No. 3,012,735 shows another type of tire material winding housing which can articulate the liner drum from a horizontal to a vertical position in addition to articulatable driving means and braking means that engage the shafts of both spools. U.S. Pat. No. 4,013,177 shows a roller conveyor apparatus which supplies a coil to be inverted by an inverter conveyor device. The coil invertor of this construction is intended primarily for use in the steel industry. Another winding and unwinding device for strip material is shown in U.S. Pat. No. 3,424,394 in which the control of the unwinding movement is maintained by main shaft and positioning arms which are movable along another shaft to position and elevate a roll on the device for unwinding. U.S. Pat. No. 3,623,677 shows another device related to the tire manufacturing process which discloses an apparatus for delivering a predetermined length of selected stock to a tire building drum which includes an unwinding apparatus that applies a brake to the material spool and drives the liner spool for delivering the strip material from a reel to the tire making drum.

One main disadvantage with such prior windup and letoff reel apparatus is the high cost of such units, since such designs require the reel or material storage spool to be mounted in integral bearings in order that the rotatably mounted spools align with the auxillary equipment for loading and unloading the spools with the strip material. Such package configuration results in a higher initial per unit cost and has reduced liability and flexibility due to the complex and expensive components thereof also resulting in higher maintenance due to the abuse that the packages experience throughout their useful life.

The number of tread storage and transport packages or units used in a usual tire manufacturing system is considerably more than the components used with the packages such as the drive units for loading and unloading the packages. Thus, the high volume package cost was considerable in contrast to the other equipment used in conjunction with the package containing the storage spools. Preferably it would be desirable to keep the cost and design complexity of the large volume component of a tire making process, namely the strip packaging and storage unit, at a low cost with the more complicated and expensive equipment being the components which are used in fewer numbers such as at the load and unload station.

Another problem that is involved with loading strip material and in particular extruded tire tread material in reel form in a package, is that the tire tread is not completely aged when loaded and stored in the wound position. When stored in a usual vertical position, that is the spool axis is parallel to the floor or supporting structure, imperfections can develop in areas of the tread due to the weight of the outer layers or convolutions of rubber on the inner convolutions.

Therefore, the need has existed for an improved system for the handling of strip material and in particular for strip components used in the tire manufacturing process which enables increased automation throughout the system at a lower cost and with increased efficiency, and for improved apparatus used in such system and in particular the package or portable storage unit for moving the strip component between the various work stations and storage areas, and to an improved drive unit for loading and unloading the strip material on and off improved portable storage units.

DISCLOSURE OF THE INVENTION

Objectives of the invention include providing an improved system for storing and processing strip material and in particular tire tread manufacturing components such as the tire tread, in which the system consists of specific extrusion line features, drive units at the windup and letoff stations, handling, storage, and transporting facilities, and in which the movement of the strip material can be highly automated, materially reducing the amount of manual handling of the strip material. Another objective is to provide such an improved system in which the portable storage units or packages containing the strip material are relatively low cost since a considerable number of such packages are required and used in a usual manufacturing operation in contrast to the more expensive drive units or equipment for loading and unloading the strip material in the packages. Another objective is to provide such a system in which the drive units at the load and unload stations can be similar in construction and operation thereby providing a lower cost unit with reduced maintenance, and in which such equipment provides interchangability of parts.

Another objective of the invention is to provide an improved portable storage unit for use in the improved system in which the unit is of an extremely simple, durable and rugged construction, free of components that require accurate alignment with the drive units at the loading and unloading stations, which reduces maintenance problems, yet which enables accurate alignment to be achieved with the load and unload equipment when at the respective load and unload stations. Another objective is to provide such an improved storage unit which can be loaded and unloaded in its usual vertical position but transported and stored in a horizontal position without effecting the alignment of the material containing spools within the unit in which the unit contains both a tread spool and a liner spool, in which the spools and connected liner material are protected within the unit from external hazards, and in which the unit is lighter in weight and less expensive to fabricate than prior portable spool-type storage units while providing reasonable life and maintenance requirements and which is compatible with existing sensing equipment for detecting when the spool is loaded or unloaded to control the operation of the associated drive equipment.

Another objective of the invention is to provide an improved drive unit for the improved storage and processing system for loading and unloading the portable storage units which are provided with a pair of expandable mandrels for cooperative engagement with the spools of the storage unit which eliminates the heretofore drive mechanisms being built into the individual storage units. Still another objective is to provide such an improved drive unit which has a movable carriage for delivering a storage unit into position with the expandable mandrels, and in which the carriage is provided with a lifting mechanism for disengaging the mandrel supported spools from the surrounding storage unit frame and cradle support members to provide subsequent free rotation and alignment of the spools by the mandrels.

Another objective of the invention is to provide such an improved system in which various types of automatic storage, retrieval and handling equipment can be used in the system and with the improved portable storage units and drive units; and in which the portable storage units can be moved into and out of engagement with the load and unload drive units in a continuous pass through a type of conveying system, or can be transported by AGV's, overhead lifting systems or the like, without affecting the operation of the drive units and portable storage unit.

These objectives and advantages are obtained by the improved system for storing and processing strip material, the general nature of which may be stated as including a portable storage unit comprising a rigid frame, rotatable spool means for receiving and discharging a length of strip material thereon, and cradle means for loosely supporting the spool means within the frame; first drive means removably engageable with the spool means for lifting the spool means off the cradle means and then rotating said spool means in a first direction to store a length of the strip material on said spool means; second drive means removably engageable with the spool means for lifting the spool means off the cradle and then rotating the spool means in a second direction opposite to the first direction to payout stored strip material from said spool means; and transport means for moving the storage unit between the first and second drive means.

These objectives and advantages are further obtained by the improved portable storage unit for handling and storing lengths of flexible strip material, the general nature of which may be stated as including a rigid frame adapted to be selectively placed on a supporting structure in either a horizontal position or vertical position; first and second cradles formed within the frame; first and second spools each having a longitudinal axis parallel to and spaced from the other spool axis for receiving and storing flexible strip material thereon, said spools being supported on the first and second cradles, respectively, with said axes being horizontal when the frame is in the vertical position for receiving and discharging strip material from and off said spools; and flange means formed on each of the spools and engageable with the frame for maintaining the spools within their respective cradles when the frame is in the horizontal position and the spool axes are vertical.

These objectives and advantages are still further obtained by the improved drive unit of the type adapted for engagement with a pair of spools loosely supported within a portable storage device for storing and transporting a length of strip material, the general nature of which may be stated as including a pair of expandable mandrels for clamping, driving and tensioning of the liner engagement of the spools of the storage device; drive means for rotatably driving one of the mandrels to rotate a spool clampingly engaged with said one mandrel; carriage means horizontally movable with respect to the mandrels for transporting a storage device into and out of engagement with the mandrels, said carriage means including a base and a platform; and lifting means mounted on the carriage means for vertically moving the platform with respect to the base to vertically move a storage device supported on said base with respect to the spools when the spools are clampingly engaged with the mandrels to move the storage device into and out of engagement with the spools.

BRIEF DESCRIPTION OF THE DRAWINGS

Preferred embodiments of the invention, illustrative of the best modes in which applicant has contemplated applying the principles, are set forth in the following description and are shown in the drawings and are particularly and distinctly pointed out and set forth in the appended claims.

Similar numerals refer to similar parts throughout the drawings.

BEST MODE FOR CARRYING OUT THE INVENTION

Figure 1:
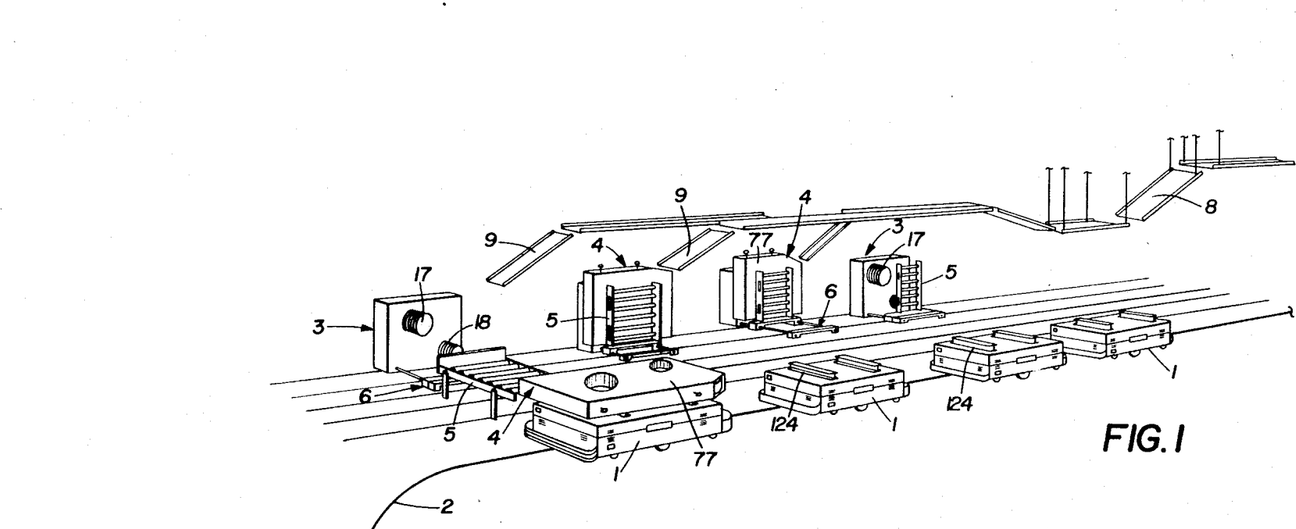
FIG. 1 is a diagrammatic perspective view of a tire tread extruder line with a plurality of the improved portable storage units shown in block diagram form being delivered on AGV's to a plurality of the improved drive units, also shown in block diagram form, located at the extruder line for loading the portable storage unit with tire tread strip material.

A tire tread extruder line portion of the improved system is shown diagrammatically in FIG. 1 and includes a plurality of automatic guided vehicles (AGV) 1 located along an energized cable 2 which usually is embedded in the floor of the building. The AGV's are located adjacent a plurality of improved drive units, indicated generally at 3. One of the improved portable storage units is indicated generally at 4, and is shown mounted in a horizontal position on top of one of the AGV's prior to being transferred onto an upender 5 after which it is placed upon a transfer carriage assembly 6 of improved drive unit 3. Drive units 3, storage units 4 and carriage assembly 6 are shown in FIGS. 1 and 2 in diagrammatic form with the details of construction being shown in the other drawing figures and described below.

The particular type of extruder line shown in FIG. 1 has a dual conveyor 8 for transporting two strips of material, hereinafter referred to as tread strips, through alternating gates 9 for loading onto a selected storage unit 4. An overhead lift mechanism (not shown) may be used as an alternate means of transferring a storage unit 4 from the AGV directly onto drive unit carriage 6 instead of upender 5. The particular extruder line shown in FIG. 1 is merely illustrative of one type of arrangement that can be used in the improved system.

Figure 2:
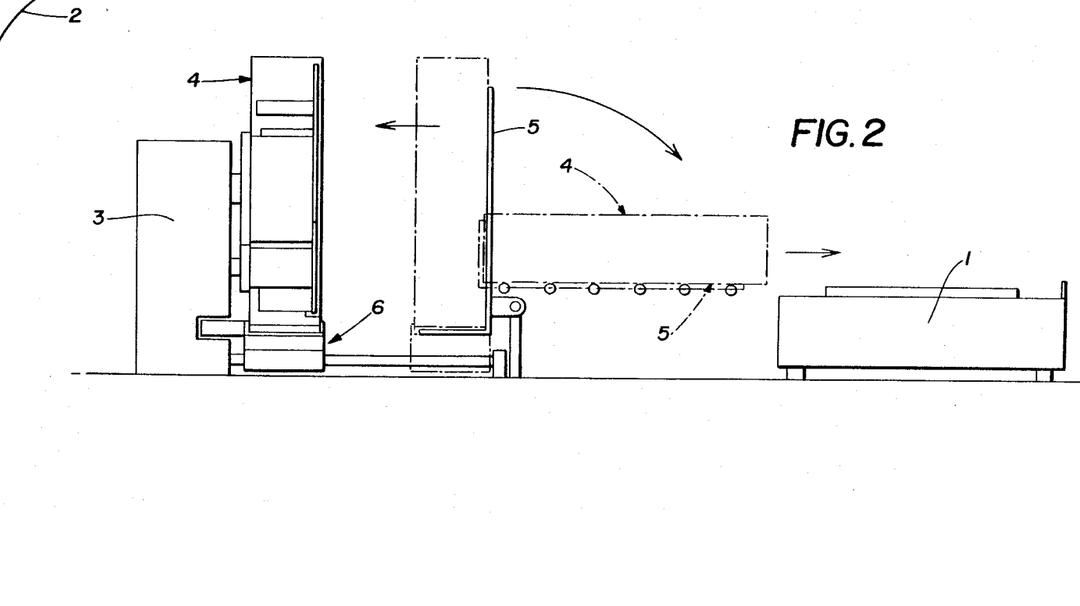
FIG. 2 is a diagrammatic, enlarged side elevational view of FIG. 1 showing the improved drive unit operatively engaged with the portable storage unit, together with an upender and carriage assembly for transferring a portable storage unit from a vertical position at the drive unit to a horizontal position on an AGV for transporting the storage unit to a storage area or other processing station.

FIG. 2 is an enlarged elevation of the left hand end portion of FIG. 1 and shows in more detail the movement of one of the portable storage units 4 from its horizontal position on top of AGV 1 onto upender 5 which orients storage unit 4 from the horizontal to a vertical position on top of transfer carriage 6. Storage unit 4 then is moved into engagement with drive unit 3 in a manner described in greater detail below. A similar type of drive unit 3, upender 5 and carriage assembly 6 can also be used at the tread unload station wherein a fully loaded portable storage unit 4 is moved by the equipment from a horizontal stored position into the vertical position for cooperative engagement with drive unit 3 for unloading the tire tread therefrom for use by a tire builder or for discharge into automatic tire making equipment.

In accordance with one of the features of the invention, improved drive unit 3 is nearly identical in construction and operation when used both at the extruder line or tire tread load station as well as at the tire tread unload station. This eliminates multiple types of drive equipment with the resulting increased maintenance, spare parts inventory and other expenses, which are materially reduced by the ability to use the drive unit at both the load and unload stations.

Improved drive unit 3 is shown particularly in FIGS. 3-7. Drive unit 3 includes as its main components a pair of fixed stands 15 and 16 on which are mounted a pair of pneumatic expandable mandrels 17 and 18, referred to as the tread spool mandrel and liner spool mandrel, respectively. A drive motor 19 is mounted on a base 20 which is supported by and extends between drive stands 15 and 16. Motor 19 is connected by a drive chain 21 to mandrel 17 when drive unit 3 is used at the loading station with a brake mechanism 22 being operatively connected with liner spool mandrel 18. When drive unit 3 is used at the letoff or unload station, drive chain 21 will be connected to mandrel 18 with brake mechanism 22 being engaged with tread spool mandrel 17. Other than the reversal of drive chain 21 and brake mechanism 22, the drive unit will be the same for both the load and unload applications.

In accordance with another feature of improved drive unit 3, carriage assembly 6 is mounted adjacent drive stands 15 and 16 for moving a portable storage unit 4 into operative engagement with mandrels 17 and 18 as described below. Carriage assembly 6 includes a carriage 25 having a base 26 which is movably supported by a plurality of wheels 27 on a pair of parallel rails 28. Wheels 27 preferably have an outer annular flange 29 which maintains the wheels and supported base in alignment on rails 28.

A carriage platform 30 is vertically movably supported on base 26 by four air springs 31 located at the corners of the carriage assembly. Platform 30 includes a pair of spaced side rails 34 which extend transversely to the direction of travel of carriage 25 and has a plurality of rollers 35 rotatably mounted on and extending between rails 34. Rollers 35 enable a storage unit 4 to be moved transversely along platform 30 to the aligned position with mandrels 17 and 18. Rollers 35 may be power driven rollers or idler rollers depending upon the particular material transfer equipment used in the improved system.

Air springs 31 are usual components preferably cylindrically shaped, expandable rubber bags which are connected to appropriate air lines for filling the bags with air and for removing air therefrom to adjust the vertical height of the bag and correspondingly to adjust the vertical position of platform 30 on base 26. The air springs are mounted on plates 32 which are attached to and extend outwardly from the ends of side rails 34. A pair of adjustable stops (FIG. 7) are located at the four corners of carriage 25 and extend between base 26 and platform 30 to limit the upward and downward vertical movement of the platform with respect to the base upon expanding and collapsing of air springs 31. Each of the pair of stops include an upstop 37 formed by a bolt 38 which is positioned within an opening formed in air spring mounting plate 32 by a pair of nuts 39. The lower end of bolt 38 extends through a hole 40 formed in another plate 41 which is spaced below air spring mounting plate 32. Another set of nuts 42 and washers are mounted at the lower end of bolt 38 for stopping the vertical upward movement of platform 30.

A downstop indicated generally at 43, includes a bolt 44 mounted within a hole 45 formed in plate 41 and is retained therein by a pair of nuts 46. The extended end 47 of bolt 44 engages plate 32 to stop the downward movement of carriage platform 30 upon the decrease of air pressure within air springs 31.

Figure 3:
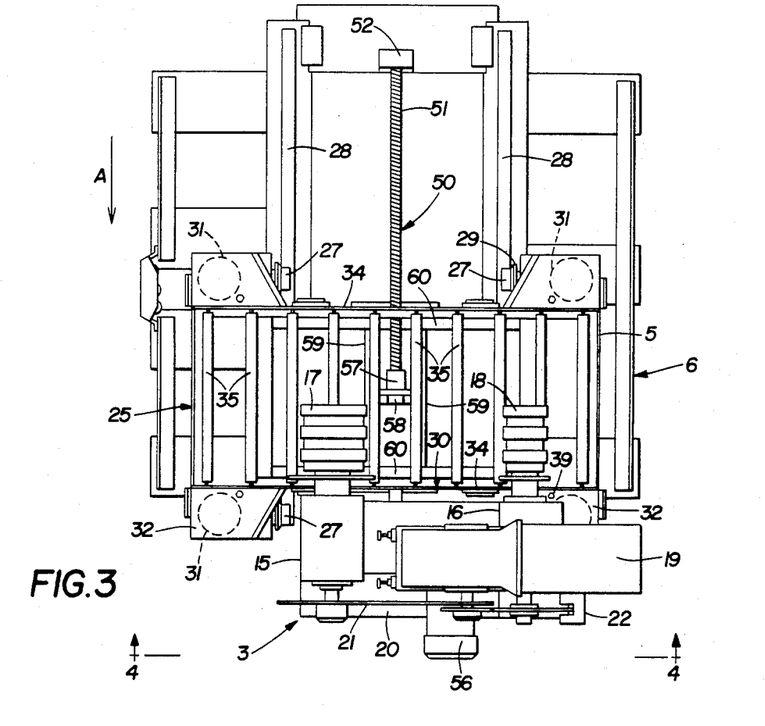
FIG. 3 is a top plan view of the improved drive unit and carriage assembly for loading and unloading the improved portable storage unit with strip material.
Figure 4:
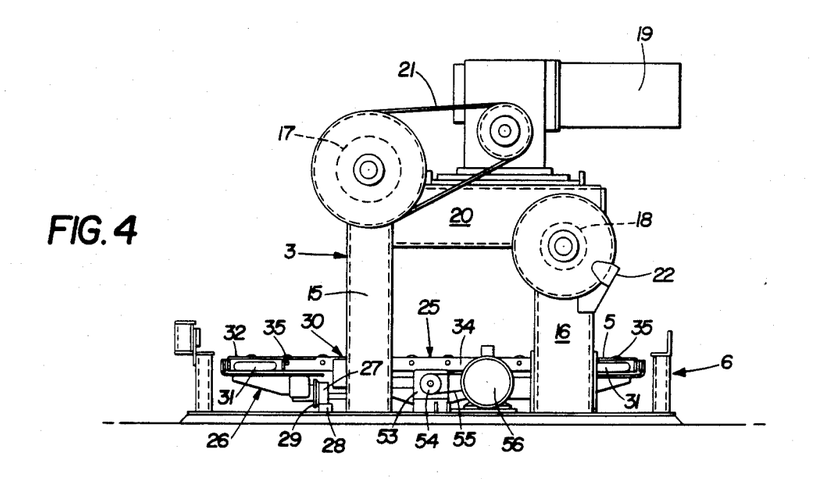
FIG. 4 is an end elevational view of the improved drive unit looking in the direction of arrows 4—4, FIG. 3.
Figure 5:
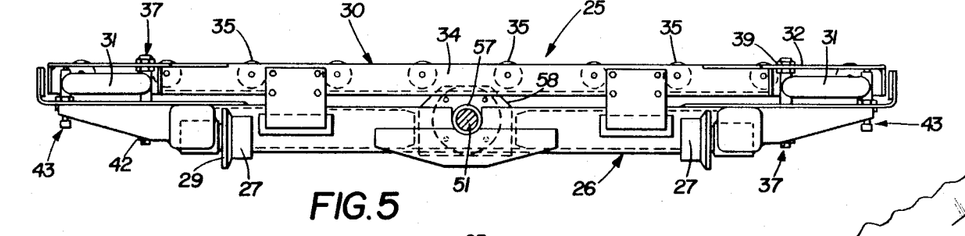
FIG. 5 is an end elevational view of the carriage assembly with the drive shaft shown in section.
Figure 6:
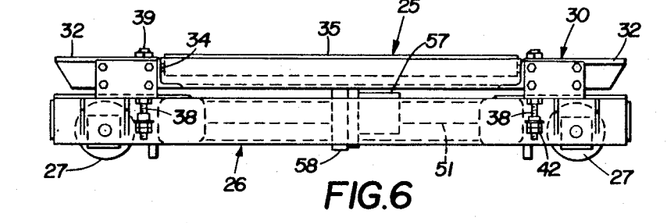
FIG. 6 is a side elevational view of the carriage assembly of FIGS. 3-5.
Figure 7:
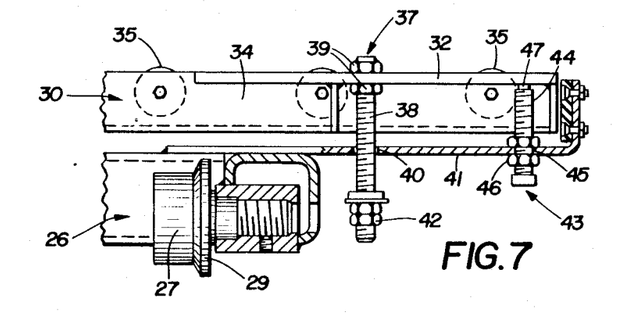
FIG. 7 is an enlarged fragmentary view, with portions broken away and in section, of the right hand portion of FIG. 5 showing the carriage assembly stop mechanisms.

Base 26 and supported carriage platform 30 is moved horizontally along rails 28 by a screw and nut drive mechanism indicated generally at 50. Mechanism 50 includes a threaded shaft 51 rotatable at its outer end by a bearing 52 and at its inner end by a bearing 53 (FIGS. 3-5). A drive pulley 54 is mounted on the inner end of shaft 51 and is connected to a drive motor 56 by a drive chain 55. Shaft 51 is operatively engaged with a nut 57 which is mounted on a bracket 58 supported by a pair of channels 59 which extend between another pair of stabilizing channels 60 attached to main carriage side rails 34. Thus, rotation of threaded shaft 51 by drive motor 56 will move carriage 25 along rails 28 by the engagement of shaft 51 with nut 57.

Figure 8:
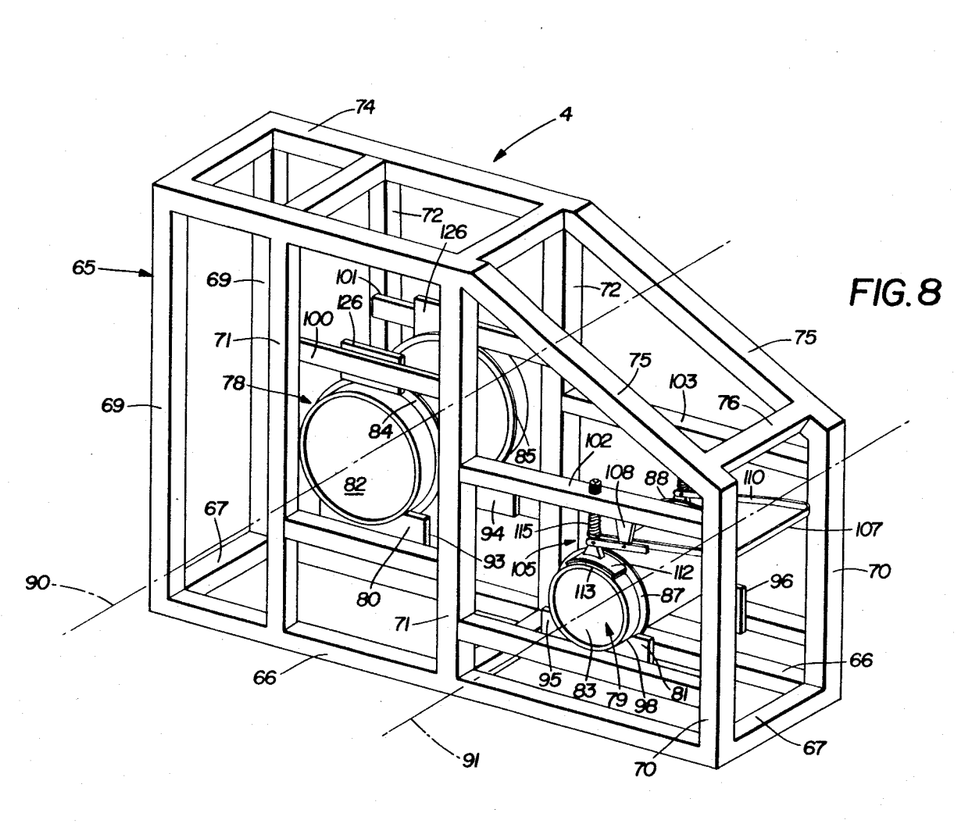
FIG. 8 is a perspective view of the improved portable storage unit for use in the improved storage and processing system.
Figures 9, 10, 11:
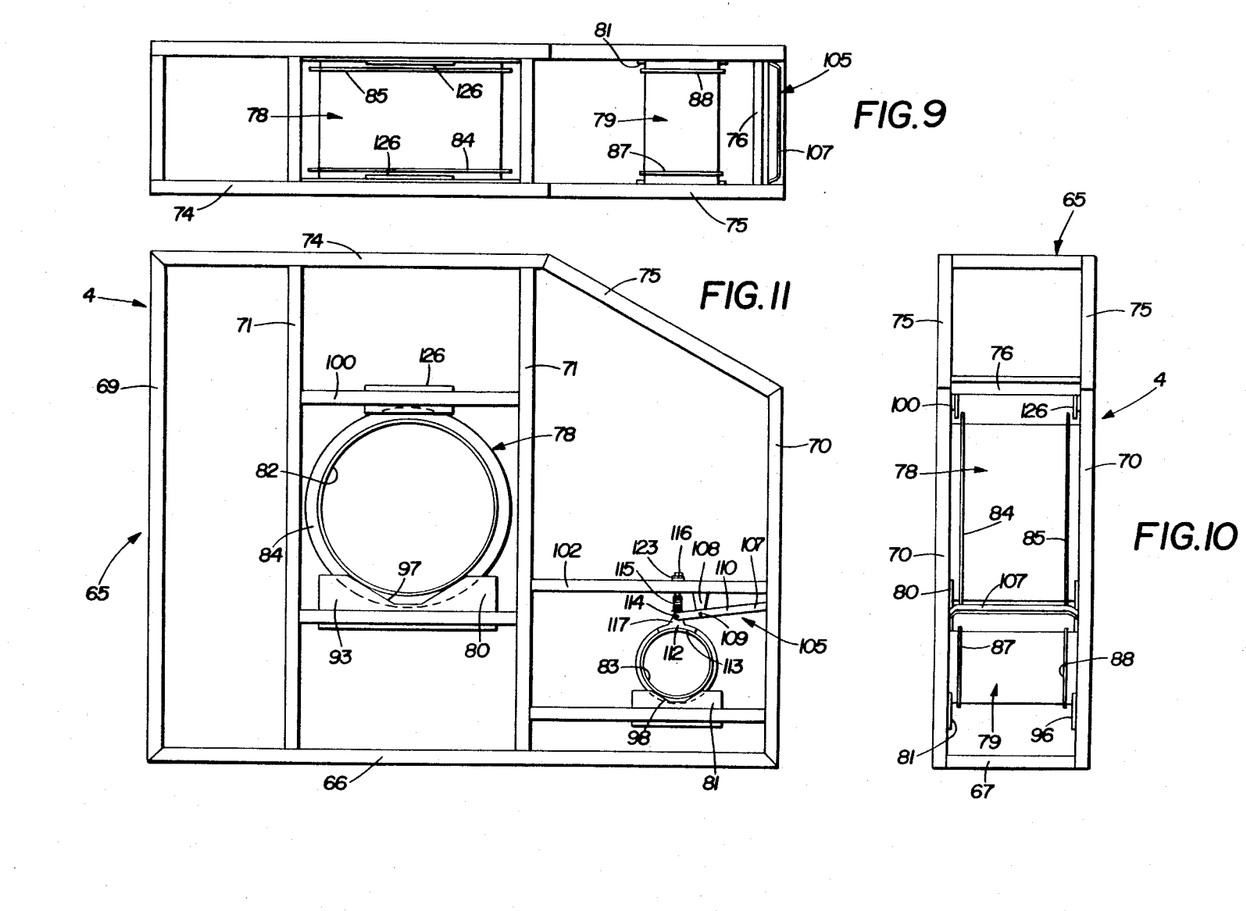
FIG. 9 is a top plan view of the improved portable storage unit of FIG. 8.
FIG. 10 is an end elevational view of the improved storage unit of FIG. 8.
FIG. 11 is a side elevational view of the improved storage unit of FIG. 8.

In accordance with another of the main features of the invention, improved storage unit 4 (FIGS. 8-12) provides an extremely simple, efficient and durable apparatus for storing a predetermined quantity of strip material, and which is compatible and adapted for use with improved drive units 3. Storage unit 4 eliminates the heretofore required precision and expensive mechanisms for rotatably mounting spools within the surrounding supporting frame structure. Storage unit 4 includes a framework case indicated generally at 65, formed by a plurality of horizontally and vertically extending tubular metal members which are connected together by welding, bolts or other types of fasteners. Case 65 includes a base for supporting the unit in a vertical upright position as shown in FIG. 8, which is formed by spaced, parallel side members 66 and spaced, parallel end members 67.

The ends of case 65 are formed by a spaced pair of rear vertical extending tubular members 69 and a pair of spaced vertical front members 70. A pair of horizontally spaced side wall forming members 71 extend vertically upwardly from one of the base members 66 and a similar pair of members 72 extend upwardly from the opposite base member 66 and are connected at their upper ends by a rectangular shaped top frame member 74. The forward end of top frame member 74 is connected with front end members 70 by a pair of spaced parallel sloped members 75 and a cross member 76. This particular arrangement of the various horizontal, vertical and sloped tubular steel members described above and shown particularly in FIG. 8 for forming storage unit case 65 can vary without effecting the concept of the invention. However, the particular case construction shown in FIG. 8 provides an extremely rigid, lightweight and durable frame able to withstand considerable handling and abuse without damage. If desired, the sides, top, ends and bottom of case 65 can be covered with a rigid mesh screen or steel panels 77 as shown diagrammatically in FIGS. 1 and 19, to prevent foreign contaminates from entering the case and as a safety feature for workman handling tne storage units or working closely adjacent thereto. Also case 65 may be supported on wheels or casters to allow towing or pushing of unit 4 manually or by mechanical means. Attachment hooks, eyes, slots or similar devices may be placed on case 65 to allow handling by fork lifts, overhead conveyors or the like.

Figure 12:
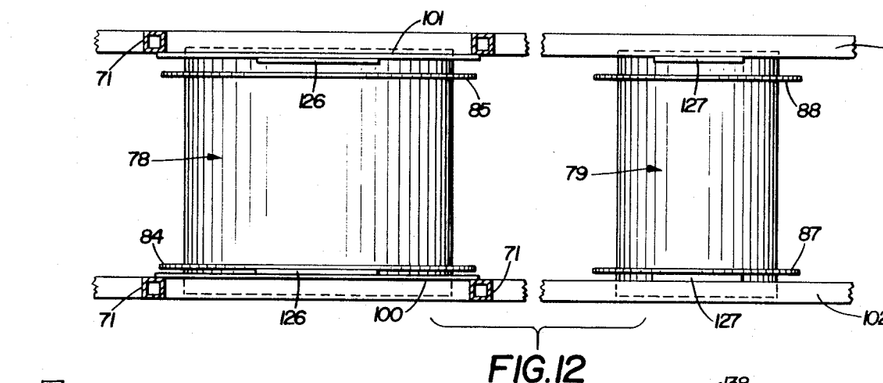
FIG. 12 is an enlarged fragmentary view with portions in section, showing the position of the tread and liner spools when the storage unit is in a horizontal storage and transport position.

A pair of spools indicated generally at 78 and 79, and hereinafter referred to as the tread spool and liner spool, respectively, are loosely supported on cradles 80 and 81, respectively. Spools 78 and 79 are hollow cylindrical shaped steel members having longitudinally extending bores 82 and 83, respectively. A pair of annular radially outwardly extending retention flanges 84 and 85 are formed on the outer surface of tread spool 78 and are located a predetermined distance axially inwardly from the edges of the spool. A similar pair of flanges 87 and 88 are formed on the outer surface of liner spool 79 and are spaced axially inwardly from the spool edges. The longitudinal axes 90 and 91 of spools 78 and 79, respectively, extend parallel to each other as shown in FIG. 8, and are parallel with a floor or horizontal supporting surface when storage unit 4 is in a vertical upright load and unload position. The axes are perpendicular to the floor or supporting structure when unit 4 is in a horizontal position as shown in FIG. 12.

Cradles 80 and 81 are formed by pairs of horizontally spaced vertically extending plates 93-94 and 95-96, respectively. Cradle plates 93-94 and 95-96 are formed with upper concave recesses 97 and 98, respectively, which loosely supports spools 78 and 79 therein as shown in FIGS. 8–11. A pair of horizontally extending retention frame members 100 and 101 are attached to sidewall forming members 71 and 72 and are located adjacent to and a short distance above spool 78. A similar pair of frame members 102 and 103 are located closely adjacent to and spaced a predetermined distance above liner spool 79 and extend horizontally between and are attached to side wall frame forming members 71 and 72 and end wall frame members 70.

Figure 17:
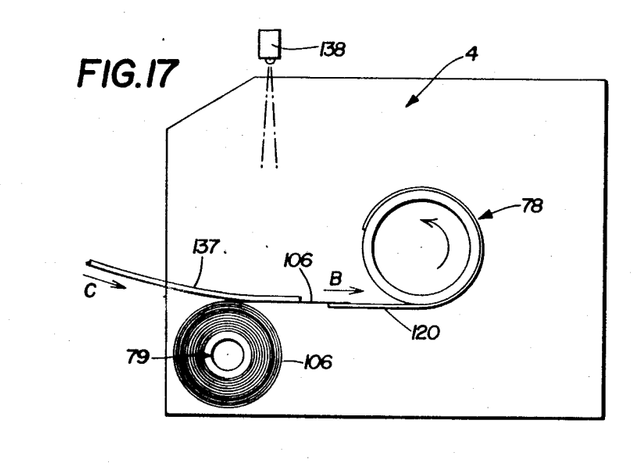
FIG. 17 is a diagrammatic side view showing the portable storage unit being loaded with a tire tread strip.
Figure 18:
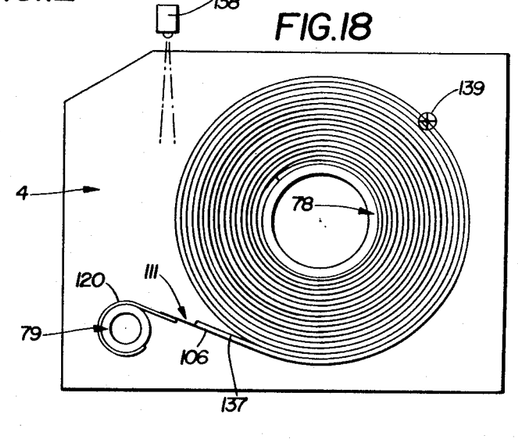
FIG. 18 is a view similar to FIG. 17 showing the tire tread strip being fully loaded on the tread spool.

A liner spool brake mechanism indicated generally at 105, preferably is mounted on case 65 for engagement with liner spool 79 to prevent any rotation of the liner spool during storage and shipment thereby maintaining a constant predetermined tension on a strip of liner material indicated at 106, and shown in FIGS. 17–18. Brake mechanism 105 includes a U-shaped lever 107 which is pivotally mounted on horizontal frame members 102 and 103 by brackets 108 and pivot pins 109 which are connected to each leg 110 of lever 107. A concave brake shoe 112 having a friction pad 113 mounted thereon is pivotally mounted by a pin 114 and bracket 117 at the extended end of each lever leg 110. A compression coil spring 115 is mounted by a bolt 116 and a pair of washers 123 at each end of lever legs 110 and biases brake shoe 112 toward braking engagement with liner spool 79.

Figure 13:
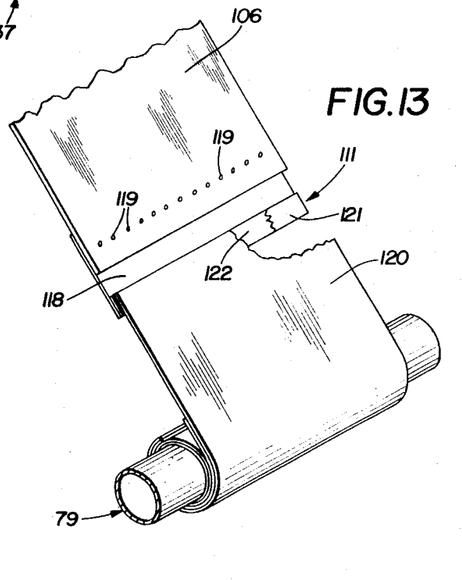
FIG. 13 is a fragmentary sectional view showing the liner leader connecting the liner to the liner spool.

For many applications and uses of portable storage unit 4, especially when used for storing strip materials in the tire industry and in particular a tire tread, a liner strip of sheet material preferably aluminum or certain types of plastic extends between and is connected to tread spool 78 and liner spool 79 as shown partially in FIG. 13. Liner 106 preferably is a light gage aluminum sheet and it enables the adjacent convolutions of the wrapped tire tread to be separated from each other to prevent the rubber from bonding or sticking together. A predetermined length of liner will extend between and be wrapped about the tread and liner spools with the ends of the liner being connected to a respective one of the spools.

In accordance with one of the features of improved storage unit 4, liner 106 is connected at its respective ends to spools 78 and 79 by a liner leader shown in FIG. 13 and indicated generally at 111. A predetermined length of fabric reinforced neoprene 118 is attached by rivets 119 or other attachment means to the end of liner 106. Another strip of neoprene 120 is attached to each of the respective spools and is connected to the adjacent neoprene strip 118 by mating strips of hook and loop fabrics 121 and 122 of the type distributed under the trademark Velcro. This attachment arrangement enables detecting mechanisms such as photoelectric devices 138 and 139 (FIGS. 17 and 18), to easily detect when the liner has reached the end of its length due to the differences in the reflection quality of the aluminum and neoprene materials to provide a signal to the drive unit to stop the rotation of the spools before the liner runs out. Should the sensing mechanism fail for any reason, the liner leader will tear free of the liner spool at the hook and loop connection without damage and can be easily rethreaded and reattached.

The advantages achieved by the improved system and apparatus is set forth in greater detail in the following description of the operation of drive unit 3 and portable storage unit 4. An empty storage unit 4 is placed by appropriate transporting mechanism, for example, as shown in FIG. 1 by the motion of power driven rails 124 mounted on top of AGV 1 onto upender 5. Upender 5 pivots unit 4 from its horizontal transported position to a vertical load position on carriage 25 with the carriage being in its extended position spaced away from drive unit 3.

In accordance with one of the features of the improved storage unit 4, it can be placed in a usual load and unload vertical position or in a horizontal position for storage and transportation in both an empty and filled condition without affecting the alignment mounting of the spools or the tread material and liner stored therein. Also, storage unit 4 can be placed on either side in the horizontal position and can withstand considerable abuse and jarring movement without affecting the stored strip material and the subsequent removal or loading of such material from or into the unit.

When unit 4 is in the vertical position, the entire weight of the spools together with the liner and strip material wound about the spools is supported entirely on cradles 80 and 81. The spools are prevented from excess axial movement which could dislodge their engagement with the cradle plates by the engagement of the lower portions of annular spool retaining flanges 84-85 and 87-88 against the inside surface of cradle plates 93-94 and 95-96, respectively. Diametrically opposite portions of the spool flanges abut against a pair of stop members 100 and 101 as shown particularly in FIGS. 8, 12 and 14–16. A similar pair of stop plates 127 preferably are mounted on horizontal retention members 102 and 103 as shown in FIG. 12 for retention engagement with annular flanges 87 and 88 of liner spool 79, especially in those applications when liner spool brake 105 is not used on storage unit 4.

Thus, spools 78 and 79 are loosely retained and trapped within case 65 by the spool flanges in combination with the lower cradle plates and upper stop plates in addition to side wall forming support member pairs 71 and 72 and front end members 70 (FIG. 8). Also, when spools 78 and 79 are not being rotated by drive unit 3 in a manner described below, brake mechanism 105 will be engaged with liner spool 79 to maintain a predetermined tension on liner 106 in those storage unit arrangements where a brake mechanism is desired. The weight of larger tread spool 78 also will be sufficient to prevent premature and unwanted rotation of the spool when supported in cradle 80.

Referring again to FIGS. 3, 14, 15 and 16, an empty storage unit 4 will be moved in the direction of arrow A, FIG. 3, toward drive unit 3 upon operation of screw and nut drive mechanism 50 until the fixed horizontally extending mandrels 17 and 18 enter into bores 82 and 83 of spools 78 and 79, respectively. Carriage 25 will be advanced until the forward circular edge of each spool abuts against a disc 129 which is mounted on the outer end of each mandrel shaft 130. Carriage 25 will continue to advance a small amount until the outer spool stop plates 126 and 127 engage the upper portion of the associated spool flanges 85 and 88. Upon carriage 25 reaching this position, an appropriate control mechanism such as a limit switch, photodetector or the like will stop the linear motion of carriage 25.

Figure 14:
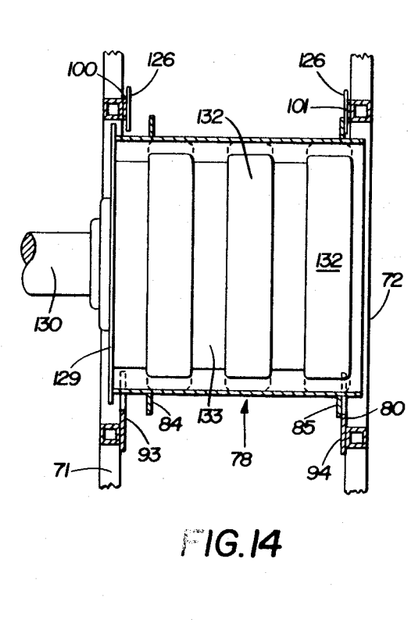
FIG. 14 is an enlarged fragmentary sectional view showing the tread spool mandrel inserted within the bore of the tread spool, with the mandrel being shown in expanded position in dot-dash lines.
Figure 15:
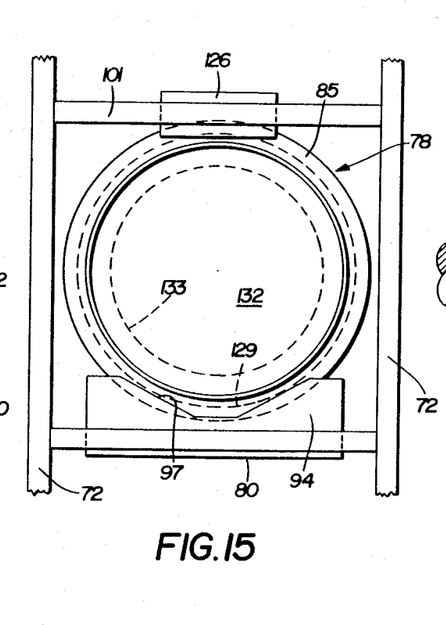
FIG. 15 is a fragmentary side elevational view showing the tread spool being supported in a raised position disengaged from the supporting cradle by the expanded mandrel.
Figure 16:
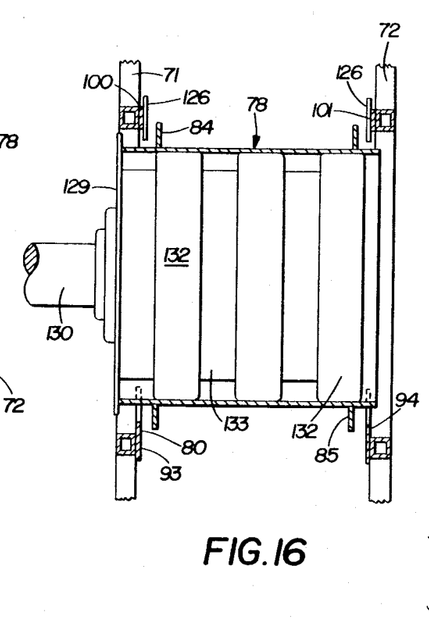
FIG. 16 is an end elevational view showing the tread spool in the raised centered position by the expanded mandrel out of contact with the surrounding case frame members and supporting cradle.

As shown particularly in FIGS. 14 and 16, each of the mandrels will include one or more annular, inflatable pneumatic tubes 132 which are mounted about a cylindrical mandrel base 133. FIGS. 14–16 illustrates tread spool 78 and mandrel 17 which will be similar to liner spool 79 and mandrel 18, therefore only one of the spools and mandrels are shown in detail. Upon the spools reaching the position of FIG. 14, mandrel tubes 132 are inflated and expand into clamping engagement with the cylindrical interior surfaces of spools 78 and 79 as shown by dot-dash lines.

After the mandrels are clamped within their respective spools, air springs 31 of carriage 25 are deflated whereby carriage platform 30 moves downwardly a predetermined distance regulated by downstops 43. This distance will be sufficient to unseat the spools from their supported position within the concave recesses of the cradle plates while still providing clearance between the tops of the spools and the adjacent retention frame members 100-103 as shown in FIG. 15. Next carriage 25 is moved a predetermined distance away from drive unit 3 to disengage the contact between the outer annular spool retention flanges 85 and 88 with stop plates 126 and 127. This movement completely frees each of the spools from any contact with the surrounding case members and stop plates while retaining the spools supported on their respective mandrels as shown in FIG. 16 and in proper alignment with each other.

Mandrel 17 then is rotated by drive motor 19 through shaft 130 which will cause the liner to move in the direction of arrow B (FIG. 17) from the liner spool toward the tread spool for receiving a strip of tire tread material 137 thereon which is being fed into the interior of case 65 by usual feed equipment (arrow C). Liner 106 and tread 137 then are wound about spool 78 with liner material 106 being located between adjacent convolutions of tread material. Mandrel 17 will continue to rotate at a predetermined speed by motor 19, with the speed of rotation of mandrel 18 being synchronized therewith through braking mechanism 22, until a loading sensor 139 detects when the thread spool has reached a fully loaded position. Sensor 139 actuates the appropriate mechanisms which will stop the feed of the tread material and sever it adjacent the inlet of case 65 resulting in a completely filled and loaded storage unit 4. The lengths of spools 78 and 79 and location of their retention flange is designed so that the tread and liner are located between the flanges leaving the outer ends of the spools free of any liner or tread material. A similar sensor 138 will be positioned to detect the liner leader and start or end of the tire tread to effect other controls of drive units 3.

Carriage platform 30 then is raised vertically by inflation of air springs 31 so that loaded tread spool 78 and liner spool 78 are resting in the concave recesses of the cradle plates. Mandrel tubes 132 then are deflated enabling the storage unit to be moved horizontally away from drive unit 3 upon movement of carriage 25 from its loading position adjacent the drive mandrels to an extended position for subsequent pickup by the appropriate material handling equipment. Liner spool brake mechanism 105 automatically reengages the liner spool outer surface located beyond the retention flanges 87-88 maintaining the desired tension on the liner with the weight of the tread spool preventing its movement or rotation on the cradle. Even when the loaded storage unit 4 is placed in a horizontal position, the engagement of the stop plates and cradle plates with the spool flanges traps the filled tread spool and partially empty liner spool in its position within case 65 (FIG. 12).

Another of the advantages of storage unit 4 is that mandrels 17 and 18 can be engaged within the bores of the spools from either side and the filled and/or empty storage unit can be placed horizontally on either side due to the symetrical arrangement of the stop plates and cradle plate and pairs of spool retaining flanges. The horizontal storage of a newly filled unit with tread material is desirable over the vertical storage since a better aging effect is achieved on the tread due to less weight being placed on the tread of the inner convolutions which occurs when aged and stored in a vertical position. When in the horizontal position the weight on the treads while cooling is uniform throughout all of the convolutions.

The unloading of a filled storage unit 4 at the tire making station is nearly identical to that described above for a loading operation except that drive chain 21 of drive unit 3 is engaged with the drive gear of liner spool mandrel 18 and the mandrel braking mechanism 22 is associated with tread spool engaging mandrel 17. Although the use and operation of drive unit 3 in cooperation with carriage assembly 6 provides an extremely efficient and effective combination with portable storage unit 4 for loading and unloading the same with strip material, storage unit 4 can be brought into operative engagement with the expandable mandrels of drive unit 3 by other types of mechanisms, such as an overhead lifting device, a fork lift vehicle, etc., without defeating the unique features and advantages achieved by storage unit 4.

Figure 19:
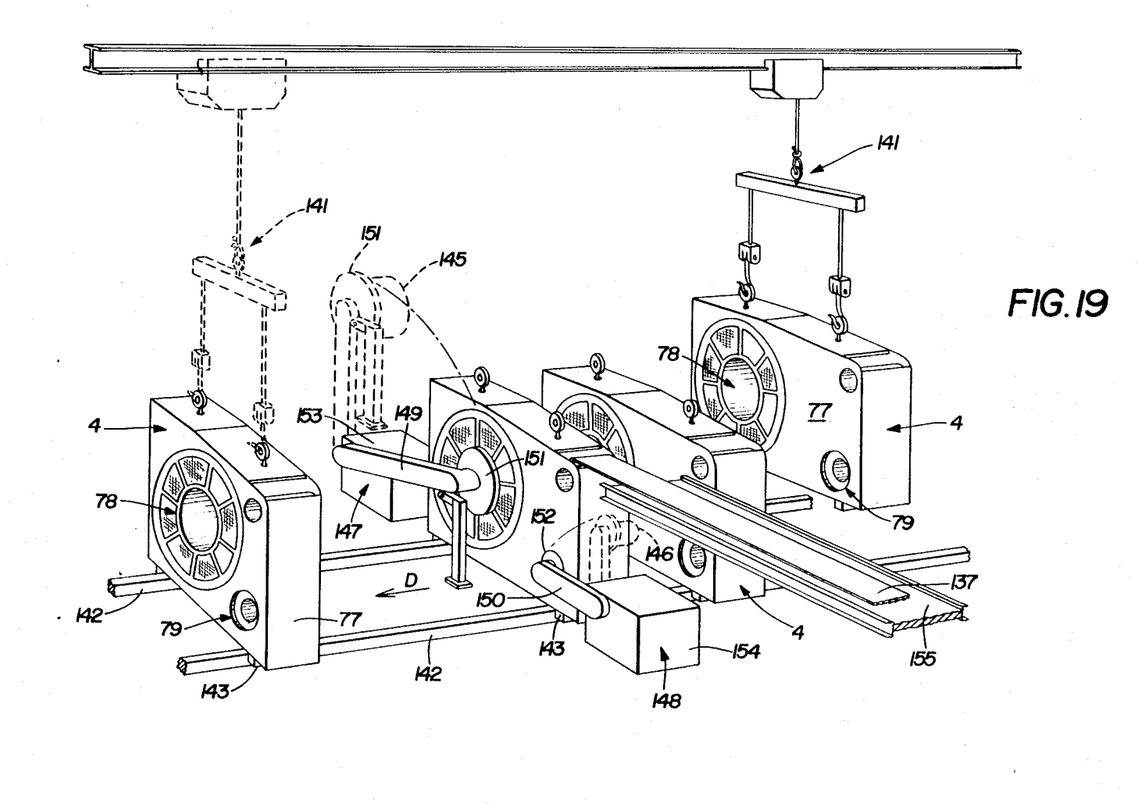
FIG. 19 is a diagrammatic perspective view with the improved storage unit being shown in block form at a pass through type unloading station in cooperation with modified drive units.

FIG. 19 shows another manner in which improved portable storage units 4 may be used with a somewhat different type of drive unit than that described above. FIG. 19 illustrates either a load or an unload station in which the portable storage units 4 (shown in block diagram form) are moved by an overhead crane system 141 and placed onto a pair of rails 142. Storage units 4 may have wheels or rollers 143 mounted on the bottom thereof to provide the rolling or sliding movement along rails 142.

The storage unit is moved along rails 142 and into engagement with the mandrels 145 and 146 which are part of modified drive units 147 and 148, respectively. Mandrels 145 and 146 are expandable and may be the pneumatic type described above for mandrels 17 and 18. The mandrels are mounted on the outer ends of a pair of arms 149 and 150 by disc-shaped mounting plates 151 and 152. Arms 149 and 150 are pivotally mounted on drive mechanisms 153 and 154, respectively, which contain the necessary components for pivotally moving arms 149 and 150 and for supplying the mandrels with the control air or other means for expanding the mandrels into clamping engagement with the interior of tread spool 78 and liner spool 79 in a somewhat similar manner as described above.

The mandrels are pivoted into the spool engaging position as shown in full lines in FIG. 19, and the storage unit advanced in the direction of arrow D until the mandrels are telescopically inserted within the interior of the respective spools. The mandrels then are expanded into the gripping relationship with the spools. The storage unit then is lowered by some adjustment means in wheels 143 or the mandrel arms pivoted upwardly a sufficient amount to displace the spools from their supported positions within cradles 80 and 81. The appropriate mandrel then is rotated to either discharge tire tread 137 or load the spool with an incoming tread strip by movement along a conveyor 155. After the tread is either loaded or unloaded in storage unit 4, the mandrels are deflated and storage unit 4 moved rearwardly a sufficient distance to enable the mandrels to be pivoted out of the linear path of the storage units defined by rails 142 as shown in dot-dash lines in FIG. 19. The storage unit then continues to move in its forward direction where it is then retrieved by overhead crane system 141 or by other material handling equipment moving it to storage or to another designated work area.

The particular material transfer system used with portable storage unit 4 can be varied as shown by the two examples in FIGS. 1 and 19 in order to achieve the advantages of storage unit 4.

Accordingly, the improved system including portable storage unit 4 and drive unit 3 enables an arrangement whereby the alignment of the spools on which the strip material is stored and transported is not dependent upon structural integrity of the package or supporting frame and requires a minimal number of components to achieve mating the spools with the drive units. Also, the present handling and storage equipment need not be designed to withstand extreme abuse since the storage unit is compatible with existing handling means and techniques, and the cost and design complexity of the system equipment which is furnished in very large quantities and in particular storage units 4, is as low as possible and relies on the system equipment which is furnished in smaller quantity, namely, drive units 3 and the material handling equipment to provide the accuracy to obtain the desired results.

Storage unit 4 has a simplified construction, reduced cost and increased flexibility and can be provided with a simple brake mechanism to maintain liner tension during transit and storage. It can be stored horizontally on either side and will accommodate the wind-up and letoff drive/brake mechanism such as drive unit 3 from either side, and the liner leader attachment to the spools permits easy liner ends detection. The storage unit can be immediately placed in a horizontal position upon being loaded with a tread to insure better aging characteristics to the tread material than heretofore possible when aged in a vertical reel configuration.

The improved system, if desired, can be fully automated using AGV's or other automated storage and retrieval equipment which will move storage units 4 between drive units 3 located at the load and unload stations, all of which can be computer controlled reducing considerably the amount of manpower heretofore required for manually handling the tread material whether in predetermined cut lengths or even when in rolled form on prior spool configurations.

Accordingly, the improved system and apparatus therefor is simplified, provides an effective, safe, inexpensive, and efficient means which achieves all the enumerated objectives, provides for eliminating difficulties encountered with prior systems and devices, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved system and apparatus for storing and transporting strip material is constructed and used, the characteristics of the system and apparatus, and the advantageous, new and useful results obtained; the new and useful structures, devices, elements, arrangements, parts, and combinations, are set forth in the appended claims.

What is claimed is:

1. An improved system for storing and processing strip material including:
   (a) a portable storage unit comprising a rigid frame, rotatable spool means for receiving and discharging a length of strip material thereon, and cradle means for loosely supporting the spool means within the frame;
   (b) first drive means having an expandable mandrel removably engageable with the spool means for lifting the spool means off the cradle means and then rotating said spool means in a first direction to store a length of the strip material on said spool means;
   (c) second drive means having an expandable mandrel removably engageable with the spool means for lifting the spool means off the cradle means and then rotating the spool means in a second direction opposite to the first direction to payout stored strip material from said spool means;
   (d) transport means for moving the storage unit between the first and second drive means; and
   (e) the rigid frame having a base for supporting said frame in a vertical position for engagement of the spool means by the mandrels, and opposite side frame members for supporting said frame in a horizontal position on either of the side frame members when being moved by the transport means.

2. The system defined in claim 1 in which the spool means includes a first cylindrical-shaped spool formed with an axially extending opening; and in which the mandrel of the first drive means is an expandable power driven rotatable mandrel adapted to be inserted into the spool opening and expanded therein for rotating said first spool.

3. The system defined in claim 2 in which the spool means further includes a second cylindrical-shaped spool formed with an axially extending opening; and in which the second drive means includes a second expandable mandrel adapted to be inserted into the opening of the second spool for rotating said second spool.

4. The system defined in claim 3 in which a strip of liner material having two ends is connected at said ends to the first and second spools and extends between said spools; in which one of the drive means includes motor means connected to the mandrel of said one drive means for rotating said mandrel; and in which brake means is engageable with the mandrel of the other of said drive means for controlling the rotation of said other mandrel.

5. The system defined in claim 4 in which other brake means is mounted on the frame of the storage unit and is engageable with one of the spools for controlling the tension on the liner material.

6. The system defined in claim 3 in which the first and second drive means each includes carriage means for moving the spools of the portable storage unit when in a vertical position into and out of engagement with the mandrels.

7. The system defined in claim 6 in which the carriage means includes a movably mounted base and a platform vertically adjustably mounted on said base.

8. The system defined in claim 7 in which upender means is located adjacent the carriage means for orienting the portable storage unit from a horizontal position on the transport means to a vertical position on the carriage means.

9. The system defined in claim 1 in which the cradle means has a concave recess for supporting the spool means; in which stop means is formed on the frame for engagement with the spool means; and in which flange means is formed on the spool means and is engageable with the cradle means and stop means to retain the spool means within the frame when the frame is in the horizontal position.

10. The system defined in claim 3 in which each of the expandable mandrels has an outer pneumatically inflatable tube which is expandable into clamping engagement with the spools.

11. The system defined in claim 10 in which the spool means includes a pair of cylindrical-shaped spools each having a longitudinal axis; in which the spool axes are parallel to each other; and in which the axes are horizontal when the frame is in the vertical position and are vertical when the frame is in the horizontal position.

12. The system defined in claim 1 in which the transport means is an automatic guided vehicle.

13. The system defined in claim 1 in which the strip material is a component for making tires.

14. The system defined in claim 13 in which the strip material is the tread component of the tire.

15. The system defined in claim 1 in which the spool means includes a pair of spools; in which the frame is moved along a linear path between the pair of mandrels; and in which the mandrels are pivotally moved into and out of the linear path of the frame for engagement with the spools.

16. A portable unit for handling and storing lengths of flexible strip material including:
(a) a rigid frame adapted to be selectively placed on a supporting structure in either a horizontal position or vertical position;
(b) first and second cradles formed within the frame;
(c) first and second spools each having a longitudinal axis parallel to and spaced from the other spool axis for receiving and storing flexible strip material thereon, said spools being supported on the first and second cradles, respectively, with said axes being horizontal when the frame is in the vertical position for receiving and discharging strip material from and off said spools; and
(d) flange means formed on each of the spools and engageable with the frame for maintaining the spools within their respective cradles when the frame is in the horizontal position and the spool axes are vertical.

17. The portable unit defined in claim 16 in which the frame is formed by a plurality of connected horizontally and vertically extending steel members; in which each above the second spool when the frame is supported in the vertical position.

19. The portable unit defined in claim 18 in which each of the spool flange means is a pair of annular outwardly extending flanges formed on the periphery of each of the cylindrical members; in which the flanges are spaced a predetermined distance axially inwardly from outer edges of the cylindrical members; and in which each of the flanges is located between the spaced cradle plates and generally adjacent to one of said cradle plates whereby one of said flanges will engage its respective adjacent cradle plate when the frame is in the horizontal position to retain the spools within their respective cradle.

20. The portable unit defined in claim 19 in which certain of the steel members are spaced from the cradle plates and are positioned closely adjacent the spool flanges generally diametrically opposite of the cradle plates; and in which the spools are trapped within the frame between the respective cradle plates and said certain steel members.

21. The portable storage unit defined in claim 20 in which stop plates are attached to said certain steel members for engagement with the spool flanges.

22. The portable unit defined in claim 16 in which the steel members are hollow rectangular-shaped tubular members.

23. The portable unit defined in claim 16 in which a flexible sheet of liner material has a pair of ends, one end being attached to the first spool and the other end being attached to the second spool with said liner material having a sufficient intermediate length between said attached ends whereby said intermediate length is transferred from the second spool to the first spool as a length of the strip material is being stored on said first spool; and in which the intermediate length of liner material is transferred from the first spool to the second spool as the stored length of strip material is being removed from said first spool.

24. The portable unit defined in claim 16 in which the frame has a rectangular-shaped base formed by two pairs of spaced parallel horizontal frame members; in which a plurality of side frame members are attached to the base members and extend vertically upwardly therefrom when the unit is in the vertical position; and in which certain of the side frame members are connected by horizontal cross members.

25. The portable unit defined in claim 16 in which each of the cradles has a concave spool supporting surface.

26. The portable unit defined in claim 17 in which brake means is mounted on the frame and is engageable with the second spool to prevent movement of said second spool within its cradle.

27. The portable unit defined in claim 26 in which the brake means includes a lever pivotally mounted on the frame having a spool engaging friction pad mounted on the first and second spool openings for rotating and aligning said spools.

29. The portable unit defined in claim 28 in which each of the expandable mandrels includes an inflatable pneumatic tube which is telescopically located within the spool opening and inflated to provide a driving clamping engagement between the mandrel and spool.

30. The portable unit defined in claim 28 in which one of the mandrels is power driven by a motor.

31. The portable unit defined in claim 28 including carriage means for moving the portable unit spools into engagement with the mandrel means.

32. The portable unit defined in claim 31 in which the carriage means includes a base and a carriage platform mounted on said base for supporting the frame in its vertical position, drive means for moving the carriage means horizontally between mandrel engaged and disengaged positions, and lifting means for vertically moving the carriage platform with respect to the base whereby the mandrel engaged spools are moved into and out of supporting engagement with the cradles.

33. The portable unit defined in claim 32 in which the lifting means is a plurality of adjustable air springs mounted between the base and platform.

34. The portable unit defined in claim 32 in which the carriage means base is movably mounted by a plurality of wheels; and in which the drive means is a rotatable threaded shaft engageable with a cooperating nut attached to the carriage means base.

35. The portable unit defined in claim 32 in which the carriage means platform includes a plurality of rollers providing a rolling support for the frame in a direction transverse to the horizontal linear movement of the carriage platform and base.

36. The portable unit defined in claim 33 in which stop means is mounted on the carriage means for limiting the vertical movement of the platform with respect to the base.

37. The portable unit defined in claim 30 in which a flexible sheet of liner material is attached to and extends between the spools; and in which brake means is engaged with the other of the mandrels for controlling the tensioning of the liner material extending between the spools.

38. The portable unit defined in claim 16 in which the strip material is a component of a tire.

39. The portable unit defined in claim 38 in which the tire strip component is a predetermined length of a tire tread.

40. A drive unit of the type adapted for engagement with a pair of spools loosely supported within a portable storage device for storing and transporting a length of strip material, said drive unit including:
 (a) a pair of expandable mandrels for clamping driving engagement with the spools of the storage device;
 (b) drive means for rotatably driving one of the mandrels to rotate a spool clampingly engaged with said one mandrel;
 (c) carriage means horizontally movable with respect to the mandrels for transporting a storage device into and out of engagement with the mandrels, said carriage means including a base and a platform; and
 (d) lifting means mounted on the carriage means for vertically moving the platform with respect to the base to vertically move a storage device supported on said base with respect to the spools when the spools are clampingly engaged with the mandrels to move the storage device into and out of supporting engagement with the spools.

41. An improved system for storing and processing strip material including:
 (a) a portable storage unit comprising a rigid frame, rotatable spool means captured within the frame for receiving and discharging a length of strip material thereon, and cradle means formed on the frame for loosely supporting the spool means within the frame;
 (b) first drive means removably engageable with the spool means for lifting the spool means off the cradle means and then rotating said spool means within the frame in a first direction to store a length of the strip material on said spool means;
 (c) second drive means removably engageable with the spool means for lifting the spool means off the cradle means and then rotating the spool means within the frame in a second direction opposite to the first direction to payout stored strip material from said spool means; and
 (d) transport means for moving the storage unit between the first and second drive means with said strip material being stored on the spool means and loosely supported by the cradle means free of any substantial support by the stored strip itself.

* * * * *